United States Patent Office 3,444,438
Patented May 13, 1969

3,444,438

THRESHOLD SEMICONDUCTOR DEVICE

Elmar J. Umblia, Hagersten, and Heinrich Wesemeyer, Nynashamn, Sweden, assignors to Telefonaktiebolaget L M Ericcson, Stockholm, Sweden, a corporation of Sweden No Drawing. Filed Sept. 8, 1965, Ser. No. 485,910
Claims priority, application Sweden, Sept. 18, 1964, 11,227/64
Int. Cl. H01k *47/26, 50/12*
U.S. Cl. 317—234 3 Claims

ABSTRACT OF THE DISCLOSURE

A threshold semiconductor device includes spaced electrodes. Between the electrodes is a semiconductor material containing at least three of the following material components: selenium, tellurium, thallium and arsenic. The device switches from a high ohmic to low ohmic state when the voltage across the electrodes exceeds a certain threshold value.

The present invention refers to a semiconductor component and more particulraly to such a component having at least two electrodes and whose resistance for increasing voltage across the electrodes suddenly changes from a first very large value, for instance 10MΩ to a second and very small value, for instance 100Ω. Upon decreasing current through the component the resistance suddenly changes from the second value to said first value.

An object of the invention is to provide a semiconductor component which is simple to manufacture and which, for instance, for the telephone art has suitable characteristics when used as a connecting element or as a spark quenching device.

The invention contemplates a semiconductor which contains at least three of the following material components, namely selenium, tellurium, thallium and arsenic, the material component selenium having a percentage of weight lying within 0–50%, tellurium within 0–74%, thallium within 0–59% and arsenic within 0–30%.

Other objects, features and advantages of the invention will be apparent from the following detailed description of the invention.

Experiments by the inventor have shown that a great number of material combinations can be used and within rather wide ranges of percentage combinations.

The following examples are noteworthy for long term stability:

| | Percentage by weight |
|---|---|
| (1) | |
| Tellurium | 19–74 |
| Thallium | 10–50 |
| Arsenic | 16–30 |
| (1a) | |
| Tellurium | 50–60 |
| Thallium | 12–18 |
| Arsenic | 20–30 |
| (2) | |
| Selenium | 33–50 |
| Thallium | 34–46 |
| Arsenic | 16–21 |
| (3) | |
| Selenium | 20–30 |
| Tellurium | 30–62 |
| Arsenic | 5–9 |
| Germanium | 12–30 |

| | Percentage by weight |
|---|---|
| (4) | |
| Selenium | 1–50 |
| Tellurium | 14.5–65 |
| Thallium | 17–59 |
| Arsenic | 3–22 |

Semiconductor components can be manufactured in bulk either by melting the corresponding material mixtures followed by a quick cooling, preferably in hermetically sealed melting pots, or by compressing corresponding powder mixtures to moulded bodies followed by sintering in an oxygen-free atmosphere. The components can also be manufactured in the form of thin layers, for instance by vacuum evaporating of a material mixture, or a casting or a sinter material on a suitable metallic or non-metallic substrate.

A metallic substrate is one suitable electrode of the component, while its other electrode can rest with a certain pressure against the free surface of the thin layer.

The material of these semiconductor components can be considered as glasslike since the material has some properties characteristic of glass as:

(a) Absence of sharp crystalline in an X-ray diffraction waveform, (b) A gradual changes from the solid to the fluid state without any sharply defined melting point as for crystalline materials, and (c) Concoidal surface of fracture.

With respect to structure, the elementary constituents in the material of the semiconductors can be divided up in two groups with different functions, that is network formers and network modifiers. By network formers is mean elements with prevalent covalent chemical bonding and a pronounced disposition for forming two- or three-dimensional structural networks in an amorphous composition (that is an arranged mixture). By network modifiers are meant elements which, due to having relatively easy polarized valence electrons, can arrange themselves in the network without causing any proper crystallization.

These glasslike materials are characterized in that the predominant character by the chemical bindings is covalent and that the included anions have closed s- and p-shells so that the covalent bonds form a continuous valence network, which extends through great areas of the material.

The occurence if any of empty metallic orbitales do not either destroy the semiconductor condition as long as corresponding atoms are not connected to each other.

Such a valence network is chracterized in that the energy gap between the valence and the conduction band is smaller the larger the network is. The material of such a valence network is an isotropic semiconductor, having an electrical conductivity $\tau$ which is electronic and is dependent on the temperature T and the energy gap ΔE in accordance with the relation $$\sigma=\sigma_0\cdot e^{-\frac{\Delta E}{KT}}$$

The conductivity can vary between for instance $$10^{-8}\text{–}10^{-3}\Omega^{-1}\cdot\text{cm.}^{-1}$$

The semiconductor material in question presents, above a certain value of voltage and current, a pronounced non-linearity of the voltage-current characteristic.

This non-linearity arises because of changes in the structure caused by:

(a) Thermal agitation.—By slowly heating the conductor, electrons attain such a high energy in comparison with the energy gap between the valence- and conduction band (ΔE) that thermal agitation can be achieved by mutual reaction between the conduction and valence electrons. When a sufficiently high energy is achieved an atomic rediffusion in the material is obtained so that a regular network structure (crystallisation) is achieved.

(b) Collision ionization due to the inner field emission.—When the electrical field power is sufficiently high the mobility of the electrons will be so high that their energy ($mv.^2/2$) is sufficient for ionization of the valence electrons, that is $mv.^2/2=\Delta E$.

The mobility of the charge carriers (that is, of the electrons and the holes) depends on their scattering in different paths within the network (lattice) and on their vibration frequency which in turn is dependent on temperature. Then the energy values of the carriers will scatter effectively. Thus, the mobility of the carriers will be determined by the thermal properties of the lattice and the threshold field power for collision ionization of the ionization energy of the valence electrons. The threshold field power can also be a function of sufficient thermal agitation in order to achieve the structural phase conversion. As the mobility of the holes is rather low and the recombination of holes and electrons is in equilibrium with the ionization current, no space charge can arise until a certain threshold field power has been achieved.

However, when it is achieved there will be around the electrodes applied on the semiconductor material a space charge, and an avalanche ionization as well as an electric gas discharge set in. The magnitude of the voltage necessary for maintaining this discharge, the glow potential, is not dependent of the length of the path of current in the material between the electrodes.

This phenomenon is first indicated by a diminishing resistance differential of the voltage-current relation. For a further increase in voltage, a negative resistance arises, and then the resistance value of the material falls several orders of magnitude, for instance from about 10MΩ to about 100Ω or less. Thus, the material changes from a distinct high ohmic condition to a distinct low ohmic condition. The threshold voltage for this transition and the voltage for maintenance of the low ohmic condition are in accordance with the preceding qualitative picture dependent on the composition of the material and the structure.

When the glow current through the material falls under a certain value, for instance 50μ a., the material reverts to its earlier high ohmic condition.

We claim:

1. A semiconductor component whose resistance switches from a very large value to a very small value when the voltage applied across the component exceeds a given threshold and reverts to the very small value when the current through the component suddenly decreases comprising at least two electrodes and a body of semiconductor material in contact with said electrodes, said semiconductor material consisting of by weight seleniumin the amount of 1 to 50%, thalium in the amount of 17 to 59% and arsenic in the amount of 3 to 22%.

2. The semiconductor component of claim 1 wherein selenium is in the amount of 33 to 50%, thallium in the amount of 34 to 46% and arsenic in the amount of 16 to 21%.

3. The semiconductor component of claim 1 wherein the semiconductor material further includes tellurium in the amount of 14.5 to 65%.

References Cited

UNITED STATES PATENTS

| | | | |
|---|---|---|---|
| 3,241,009 | 3/1966 | Dewald et al. | 317—235 |
| 3,336,484 | 8/1967 | Ovshinsky | 317—235 |

JOHN W. HUCKERT, *Primary Examiner.*

J. D. CRAIG, *Assistant Examiner.*

U.S. Cl. X.R.

317—241